Dec. 15, 1953  D. B. INCE, JR., ET AL  2,662,402
FLIGHT TEST HEAD
Filed Nov. 22, 1948
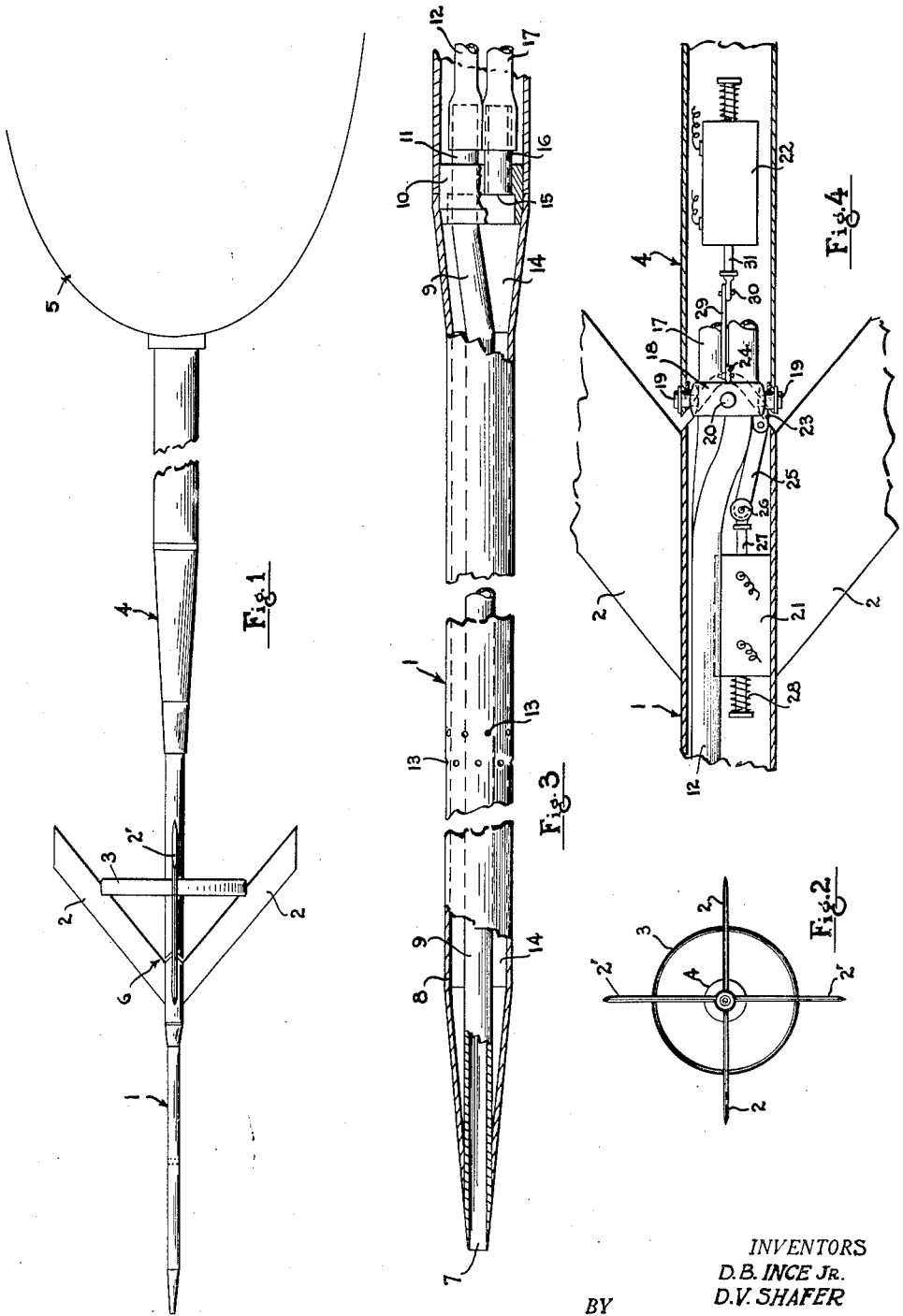
INVENTORS
D.B. INCE JR.
D.V. SHAFER
BY
William R. Lane
ATTORNEY

Patented Dec. 15, 1953

2,662,402

UNITED STATES PATENT OFFICE 2,662,402

FLIGHT TEST HEAD

Daniel B. Ince, Jr., Redondo Beach, and Donald V. Shafer, Inglewood, Calif., assignors to North American Aviation, Inc.

Application November 22, 1948, Serial No. 61,318

3 Claims. (Cl. 73—180)

This invention relates to indicating head assemblies for use in flight testing of aircraft.

These indicating heads are utilized to obtain flight test data for evaluating the performance of aircraft. The data required relates to air speed, angle of attack, and angle of yaw.

It is an object of this invention to provide a swiveling type of indicator head wherein air speed, angle of attack, and angle of yaw may be determined with a single unit.

It is a further object of this invention to provide an indicator head which is suitable for use at flight speeds up to and beyond the speed of sound.

It is a further object of the present invention to provide a compact unitary installation for obtaining the respective flight datum, each factor being independently although simultaneously indicated.

It is a still further object of this invention to provide for an installation which readily lends itself to application on advance types of aircraft.

Other objects of invention will become apparent from the following description taken in conjunction with the accompanying drawings, in which Fig. 1 is a side elevational view of an embodiment of the present invention;

Fig. 2 is a front elevational view of the unit shown in Fig. 1;

Fig. 3 is an enlarged detail, partly in section, of the forward portion of the unit shown in Fig. 1; and Fig. 4 is an enlarged detail of the central portion of the unit shown in Fig. 1.

Referring to the drawings, there is shown in Fig. 1 an installation of the indicating head forming the subject matter of this invention as applied to an advance type of aircraft. The head consists of a forward swiveling portion 1 including vanes 2 and a ballast ring 3. The entire head is supported upon a forwardly extending mast 4, the combination of portions 1 and 4 comprising a boom, attached to the aircraft 5. Swiveling movements of the head 1 are accommodated through gimbals at 6.

The nose section of the head portion 1 comprises an airspeed detecting unit. An opening 7 is provided in the front end of the tubular member 8 which forms the body of section 1. Ram air pressure admitted during flight at 7 enters a central tube 9 concentrically aligned within the member 8, the members 8 and 9 being integrally joined at their forward portions. The tube 9 extends aft to a bulkhead 10 and is arranged to pass therethrough, providing for the connection at 11 of a flexible conduit 12. The conduit 12 extends throughout the entire length of the boom, conducting the pressure indications received at the forward opening 7 to appropriate instruments within the aircraft.

Static air pressure is also admitted to the tubular member 8 through series of small orifices at 13—13. This pressure is conducted within the annular chamber 14 formed between the central tubular member 9 and the outer member 8. The chamber 14 is closed where the members 8 and 9 are joined at the forward end of the nose section and the bulkhead 10 forms the rear wall thereof. A port 15 is provided in the bulkhead and a fitting 16 serves for the attachment of a flexible conduit 17 which also extends rearwardly through the boom to conduct the pressure indications received at the orifices 13 to the appropriate instruments within the aircraft.

The entire head portion 1 is supported upon the mast 4 and is arranged for swiveling movement through gimbal mountings at 6. The gimbal mounting comprises a ring 18 positioned in a vertical plane within the forward end of the mast 4. The ring is secured in pivoted relationship by pins 19 mounted in bearings upon the mast. A second pair of pins 20 at 90° from the first pair provides means for attaching the head section 1 to the ring, also in a pivoted relationship. The adjacent ends of the head and the mast at the gimbal connection are appropriately contoured to provide an interfitting joint, clearance being allowed to permit the desired degree of angular deflections of the head 1 in either plane relative to the fixed mast 4.

The entire head section 1 is balanced both statically and aerodynamically through the provision of pairs of vanes 2—2', together with a ballast ring 3. The vanes, located 90° apart about the head, comprise rearwardly swept blades. The static balance of the forward head portion 1 about the gimbal 6 is further assisted through the location of the annular member 3. In addition to supplying the required ballast weight this member serves structurally to tie the respective vanes together to minimize vibration.

Aerodynamically the head assembly is also balanced by the pairs of vanes 2—2'. The cross section of each blade comprises an aerodynamic section. In flight the airflow over the vanes tends to maintain the movable head in the desired alignment with the airstream. Since the vane sections comprise balanced airfoils, the statically balanced head will seek a neutral position in normal flight.

To eliminate hunting tendencies of the head portion 1 the individual vane members of each pair are mounted in opposed relationship. This is accomplished, for example, by positioning the vanes to provide a 1° positive angle of attack for one blade and a 1° negative angle of attack for the opposite blade of the pair. By this arrangement the respective members of the pair tend to create opposing forces. To eliminate torque effects the two pairs of vanes are arranged in an overall opposed relationship wherein one pair induces a clockwise torque which the other pair counteracts by way of a counter-clockwise torque, thus to provide a total effect of a high degree of stability.

In addition to maintaining the position of the airspeed head to provide true readings under all conditions, the vanes simultaneously serve to provide indications of the attitude of the aircraft during flight maneuvers. The vanes tend to maintain the forward head portion 1 in an established relationship with respect to the airstream at all times. The relative angular deflections of the head with respect to the supporting mast 4, which is fixed to the aircraft, may be used as a basis for determining the angles of yaw and attack resulting during turning, diving, climbing, and combinations of these maneuvers.

As a means for obtaining an indication of the relative position of the head with respect to the mast, a pair of sensing devices 21 and 22 are secured within the head and mast bodies, respectively, adjacent the gimbal 6. These units comprise wire-wound resistors having sliding contact members which provide electric signals which vary as the contacts are moved axially along the coils to increase or decrease the resistance. One unit is responsive to movements in a horizontal plane while the second unit serves a similar purpose with respect to movements in the vertical plane.

The gimbal ring 18 is provided with lugs 23—24 which serve as attachment points. A link 25 is pivotally connected to the lug 23 and is also pivotally connected at the opposite end at 26 to one end of a bar 27 arranged for limited reciprocating longitudinal movement. The bar 27 carries the sliding contact member for engaging the wirewound resistor which is provided within the unit 21, whereby a varying signal is provided as the resistance is changed. A spring 28 is included to maintain the linkage under tension to minimize the effects of any play from slight dimensional inaccuracies which may result from minor variations arising through manufacturing tolerances. A similar installation is provided for the unit 22, a link 29 connecting to lug 24, which is located at a point 90° around the gimbal ring from the lug 23, and connected at the opposite end at 30 to bar 31 of unit 22.

By means of the foregoing arrangement angular deflections of the nose section 1 with respect to the fixed portion 4 of the mast are translated into linear movements whereby the detector units 21 and 22 will transmit electrical signals. These signals may be read directly upon indicators provided within the aircraft cockpit for the pilot, or may be automatically recorded by appropriate equipment for future examination.

The general design of indicating heads is predicated upon certain basic aerodynamic principles. However, the inter-relationship of the several component portions is of extreme importance if the desired results are to be obtained with any degree of reliability. In the present instance, determination of length, diameter, and shape of the nose unit, including size, number and location of openings, nose contour and after portions, etc., must be considered concurrently. The resultant unit is capable of satisfactorily operating in advanced speed ranges, providing a compact installation of minimum weight and simplified construction.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A device for accurately measuring flight characteristics of an aircraft comprising a boom having mast and tip portions, said mast being adapted to be rigidly attached to said aircraft; universal joint means connecting said portions so that they are normally in substantial axial alignment; means for maintaining said tip portion parallel to the airstream regardless of the attitude of the aircraft in flight, said tip being provided with dynamic and static pressure orifices adapted to be connected to air speed indicating means; means carried by one of said portions and operatively connected to the other of said portions for sensing relative horizontal movement therebetween; and means carried by said other portion and connected to the said one portion for sensing relative vertical movement therebetween; whereby true air speed, angle of attack and angle of yaw will be obtained simultaneously.

2. A device as recited in claim 1 in which said sensing means comprises a wire wound resistor carried by each of said portions and a sliding element carried by each of the other of said portions, each sliding element being in contact with the resistor carried by the other portion, one of said resistors sensing angle of attack and the other of said resistors sensing yaw.

3. A device for accurately measuring flight characteristics of an aircraft comprising a boom having mast and tip portions, said mast being adapted to be rigidly attached to said aircraft; universal joint means connecting said portions so that they are normally in substantial axial alignment; means for maintaining said tip portion parallel to the air stream regardless of the attitude of the aircraft in flight, said tip being provided with dynamic and static pressure orifices adapted to be connected to air speed indicating means; means carried by one of said portions and operatively connected to said universal joint means for sensing relative horizontal movement therebetween; and means carried by said other portion and connected to said universal joint means for sensing relative vertical movement therebetween; whereby true air speed, angle of attack and angle of yaw will be obtained simultaneously.

DANIEL B. INCE, Jr.
DONALD V. SHAFER.

References Cited in the file of this patent

UNITED STATES PATENTS

| Number | Name | Date |
|---|---|---|
| 1,332,810 | Danielson | Mar. 2, 1920 |
| 1,342,944 | Danielson | June 8, 1920 |
| 1,620,633 | Colvin | Mar. 15, 1927 |
| 2,006,805 | Gwinn | July 2, 1935 |
| 2,191,955 | Chappell et al. | Feb. 27, 1940 |
| 2,402,311 | Bissett | June 18, 1946 |
| 2,463,585 | Young | Mar. 8, 1949 |
| 2,512,278 | Jones | June 20, 1950 |
| 2,513,390 | Young | July 4, 1950 |
| 2,554,634 | Paine et al. | May 29, 1951 |

FOREIGN PATENTS

| Number | Country | Date |
|---|---|---|
| 124,827 | Great Britain | Apr. 10, 1919 |
| 610,427 | Great Britain | Oct. 15, 1948 |